Patented Feb. 14, 1950

2,497,838

UNITED STATES PATENT OFFICE 2,497,838

STARCH TREATMENT

John Marshall Newton and Lee D. Ough, Clinton, Iowa, assignors to Clinton Industries, Inc., Clinton, Iowa, a corporation of Delaware No Drawing. Application November 16, 1948, Serial No. 60,419

10 Claims. (Cl. 195—99)

This invention relates to the treatment of corn starch to condition it for or during enzymic conversion.

In the manufacture of paper, a paste made from corn starch is extensively employed in coating of the paper. Customarily, the paper manufacturer purchases dry starch and as the paste is needed in the paper making process batches of starch are slurried in water, cooked, and subjected to conversion by means of enzymes. This conversion operation requires close control and the maintenance of certain conditions to obtain the optimum conversion. It is apparent that uniformity from day to day in the quality of the coating produced is more readily attained if uniformity in the conversion of the starch can be attained and relied upon.

In the paper mills, either from the water supply itself or from the equipment used, the aqueous starch slurries frequently become contaminated by copper and other heavy metals to an extent which frequently inhibits the most satisfactory converting action of the enzymes.

We have discovered that by adding to the starch, prior to the conversion step, certain phytates or phytic acid the deleterious effect of the metals is completely overcome and the enzymic conversion proceeds satisfactorily. It is believed that these additives to the starch form nonionized complexes with the heavy metal ions and thereby prevent the heavy metals from inhibiting the enzymic conversion.

Alternatively, certain phytates may be added to the starch slurry prior to or during the conversion, or both, and the inhibiting action of the heavy metals may thus be overcome.

Accordingly, one of the objects of our invention is to condition starch for enzymic conversion by adding to the starch prior to the conversion a material selected from the group consisting of sodium, potassium, calcium and magnesium phytates and phytic acid, or mixtures thereof.

Another object of the invention is to provide during an enzymic conversion of starch a substance selected from the group consisting of sodium, potassium, calcium and magnesium phytates and phytic acid, or mixtures thereof, present in amount sufficient to form non-ionized complexes with any heavy metals then present to prevent such metals from interfering with the optimum conversion of the starch.

Another object of the invention is to provide the protection for the enzymic conversion by securing a uniform dispersion of the phytins in the starch prior to conversion.

Other objects and advantages of the invention will be alluded to hereinafter or will become apparent from a perusal of the entire specification.

The following example will illustrate one method by which the invention may be practiced. During the manufacture of the starch before it is filtered preparatory to being dried, the starch, as a result of prior process steps in the usual wet milling process, is in a dilute aqueous suspension usually referred to as "starch milk," because of its color. To apply this method of our invention, calcium phytate is dissolved in hydrochloric acid and the solution is added to the starch milk and thoroughly mixed therein. The starch milk is then neutralized to about 7.0 pH and thereafter filtered, washed on the filter, and dried according to normal plant practice. It is found that the neutralization above referred to causes the calcium phytate to precipitate in a uniform manner and to adhere to the starch during the subsequent filtering, washing and drying.

The concentration of the starch slurry at the time of addition of the phytate is not critical, hence may be in accordance with customary plant practice for such starch milk prior to filtration and washing.

Later, when the paper manufacturer slurries the dried starch in water and subjects it to cooking followed by enzymic conversion in accordance with his customary methods, the conversion proceeds satisfactorily to completion.

The amount of calcium phytate recommended for addition to the starch is about in the proportion of three (3) pounds of the phytate per thousand (1000) pounds of dried starch, when the copper contamination of the water does not exceed 1 part per million. The copper content of the water, here referred to, is believed to be a good general criterion of the phytate dosage required, as it is felt that copper is particularly deleterious to enzymic conversion and in commercial practice is usually the only metal contamination which need be considered. These proportions are subject to some variation dependent upon the amount of metallic contamination. If the metal contamination in parts per million be greater, more phytate should be incorporated in the starch in substantially the above stated proportions. While an excess of phytate is not known to be harmful, the proportions indicated give good results. No particular proportion is critical, hence the extent of the attained improvement in the conditioning of the starch for enzymic conversion is correlated with how much of the needed phytins are actually supplied to the starch with respect to a particular water supply. If the original metal contamination be great enough to inhibit conversion it is measurable and phytins may then be supplied as herein indicated to meet the need.

While calcium phytate is preferred because of its present availability, we may also use sodium, potassium or magnesium phytate, phytic acid or calcium-magnesium phytate. In these instances the proportions would be essentially the same.

We have found that calcium phytate dissolves in hydrochloric acid in the proportion of one pound of phytate to two pounds of 10% hydrochloric acid and that the neutralization of the starch milk with the acid and phytate in it is preferably accomplished with $Na_2CO_3$. While the starch milk is preferably adjusted to 7 pH, a range of 5 to 8 pH may be employed.

Sulphuric acid and other acids in similar proportions may be used in place of hydrochloric acid, with good results. If any of the insoluble phytates, calcium, magnesium or calcium-magnesium phytate are employed they should first be dissolved in acid before addition to the starch milk, and then precipitated by neutralization, as heretofore described.

When a water soluble phytate, such as sodium or potassium phytate or phytic acid, is added to the starch milk, $Ca(OH)_2$ would be the preferred neutralizing agent for adjusting the pH to between 5 and 8 pH, in order to insure the presence of calcium ions for precipitation of the phytate on the starch. When these water soluble phytates are added to the starch milk they may be added directly thereto but, if desired, to promote uniformity of dispersion of the relatively small quantity of phytates being added, these soluble phytates may be just mixed into and dissolved in water before addition to the starch milk.

As an alternative method, the phytates may be added directly to the starch slurry or paste at the paper mill before or during the enzymic conversion in about the proportions stated in the first example. In using this method, sodium or potassium phytate, or phytic acid are recommended because of their solubility in water. Should calcium or magnesium or calcium-magnesium phytate be added to the starch slurry or paste at the paper mill it should be dissolved in acid in the manner heretofore described. In any case the adjustment and maintaining of the optimum pH for enzymic conversion should conform to the established practice for that operation.

While we have described herein preferred methods and proportions for the practice of this invention, it should be understood that considerable variation thereof may be utilized without departing from the principles and scope of the invention as defined in the appended claims.

We claim as our invention:

1. A method of conditioning starch for enzymic conversion comprising dissolving magnesium phytate in an acid, mixing the solution with an aqueous starch slurry, neutralizing the starch milk to a pH range of 5 to 8 to effect precipitation of the phytate on the starch, and thereafter de-watering and drying the starch.

2. A method of conditioning starch for enzymic conversion comprising dissolving in an acid about 3 pounds of calcium phytate per 1000 pounds of starch to be conditioned, mixing the solution with an aqueous starch slurry, neutralizing the starch milk to a pH range of 5 to 8 to effect precipitation of the phytate on the starch, and thereafter filtering, washing and drying the starch.

3. A method of conditioning starch for enzymic conversion comprising dissolving in hydrochloric acid calcium-magnesium phytate, mixing the solution with an aqueous starch slurry, neutralizing the starch milk to a pH range of 5 to 8 with $Na_2CO_3$ to effect precipitation of the phytate on the starch, and thereafter filtering, washing and drying the starch.

4. A method of conditioning starch for enzymic conversion comprising dissolving calcium phytate in hydrochloric acid, mixing the solution with an aqueous starch slurry, neutralizing the starch milk to a pH range of 5 to 8 to effect precipitation of the phytate on the starch, and thereafter de-watering and drying the starch.

5. A method of conditioning starch for enzymic conversion comprising dissolving in hydrochloric acid about 3 pounds of calcium phytate per 1000 pounds of starch to be conditioned, mixing the solution with an aqueous starch slurry, neutralizing the starch milk to a pH range of 5 to 8 to effect precipitation of the phytate on the starch, and thereafter filtering, washing and drying the starch.

6. A method of treating starch milk during the manufacture of starch prior to final filtering and drying of the starch comprising adding to the starch milk an acid solution of calcium phytate, mixing the solution with said starch milk, neutralizing the starch milk to a pH range of 5 to 8 to effect precipitation of the phytic material, and thereafter filtering and drying the starch.

7. A method of conditioning starch for enzymic conversion in the presence of metal contaminated water comprising adding to and dispersing in the starch a material selected from the group consisting of sodium, calcium, potassium and magnesium phytates and phytic acid.

8. A method of conditioning starch for enzymic conversion in the presence of metal contaminated water comprising preparing a solution of a material selected from the group consisting of sodium, calcium, potassium and magnesium phytates and phytic acid and adding the solution to the starch.

9. A method of treating starch during the manufacture thereof prior to final filtering and drying of the starch to condition it for use in an enzymic conversion thereof in the presence of metal contaminated water comprising dispersing in the starch milk a material selected from the group consisting of sodium, calcium, potassium and magnesium phytates and phytic acid, adjusting the pH of the starch milk to within the range of 5 to 8 pH to effect precipitation of the phytate on the starch, and thereafter filtering and drying the starch.

10. A method of conditioning starch for enzymic conversion in the presence of copper contaminated water comprising adding to and dispersing in the starch a material selected from the group consisting of sodium, calcium, potassium and magnesium phytates and phytic acid.

JOHN MARSHALL NEWTON.
LEE D. OUGH.

REFERENCES CITED

The following references are of record in the file of this patent:

UNITED STATES PATENTS

| Number | Name | Date |
|---|---|---|
| 2,094,023 | Pollak | Sept. 28, 1937 |
| 2,364,590 | Schopmeyer | Dec. 5, 1944 |